US 7,891,227 B2

(12) United States Patent
Moeck et al.

(10) Patent No.: US 7,891,227 B2
(45) Date of Patent: Feb. 22, 2011

(54) GRIPPING APPARATUS FOR GRIPPING AND HOLDING ELONGATED WORKPIECES, IN PARTICULAR FOR BENDING MACHINES

(75) Inventors: Joerg Moeck, Sonnenbuehl (DE); Stefan Holder, Pliezhausen (DE); Paul Frick, Reutlingen (DE)

(73) Assignee: WAFIOS Aktiengesellschaft, Reutlingen, DE (US)

( * ) Notice: Subject to any disclaimer, the term of this patent is extended or adjusted under 35 U.S.C. 154(b) by 411 days.

(21) Appl. No.: 12/047,487

(22) Filed: Mar. 13, 2008

(65) Prior Publication Data

US 2008/0223101 A1    Sep. 18, 2008

(30) Foreign Application Priority Data

Mar. 14, 2007    (EP)    ................... 07005309

(51) Int. Cl.
*B21D 43/10*    (2006.01)

(52) U.S. Cl. .............. 72/422; 72/295; 72/300; 294/115

(58) Field of Classification Search ........... 72/293, 72/295, 300, 301, 316, 361, 407, 422, 434, 72/452.8, 452.9, 453.18, 482.1, 482.3, 482.4; 269/32, 34, 228; 901/36, 37, 38; 294/115, 294/116
See application file for complete search history.

(56) References Cited

U.S. PATENT DOCUMENTS

| 1,796,197 | A | * | 3/1931 | Galbraith | ............. 294/115 |
| 3,125,370 | A | * | 3/1964 | McGill | ............. 294/115 |
| 4,211,123 | A | | 7/1980 | Mack | |
| 4,348,044 | A | | 9/1982 | Wood, III | |
| 4,381,169 | A | | 4/1983 | Muhr et al. | |
| 4,448,056 | A | * | 5/1984 | Baba | ............. 72/422 |
| 4,492,105 | A | * | 1/1985 | Kutz et al. | ............. 72/302 |
| 4,604,885 | A | | 8/1986 | Lang | |
| 4,735,075 | A | | 4/1988 | Saegusa | |
| 4,761,986 | A | * | 8/1988 | Maunz et al. | ............. 72/405.09 |
| 4,945,747 | A | | 8/1990 | Yogo | |
| 5,113,683 | A | | 5/1992 | Lafrasse | |
| 5,291,771 | A | | 3/1994 | Tomo et al. | |

(Continued)

FOREIGN PATENT DOCUMENTS

DE    29 46 469 A1    5/1981

(Continued)

OTHER PUBLICATIONS

Related U.S. Patent Publication No. 2008/0184761, published Aug. 7, 2008 (bibliographic data and image file wrapper print outs).

*Primary Examiner*—Edward Tolan
(74) *Attorney, Agent, or Firm*—Patterson Thuente Christensen Pedersen, P.A.

(57) ABSTRACT

A gripping apparatus for gripping elongated workpieces comprises a housing, carrying two pivotable gripping jaws which are movable between opened and closed positions, as well as a guiding body, in which the housing is displaceably supported.

A rod having a control element which is located between both gripping jaws and is displaceable between a position retracted into the gripping jaws and so as to spread them apart, and an opposite position, where the gripping jaws are converged.

The control element engages the housing and, during a further movement in the retraction direction moves the housing.

19 Claims, 3 Drawing Sheets

U.S. PATENT DOCUMENTS

| | | | |
|---|---|---|---|
| 5,555,763 A * | 9/1996 | Takeshita | 72/420 |
| 5,566,565 A | 10/1996 | Saegusa | |
| 5,765,426 A | 6/1998 | Saegusa | |
| 5,852,945 A | 12/1998 | Burger | |
| 5,873,278 A | 2/1999 | Saegusa | |
| 5,884,952 A * | 3/1999 | Chadwick | 294/88 |
| 6,694,794 B2 | 2/2004 | Crippa | |
| 7,047,785 B2 | 5/2006 | Peruzzo et al. | |
| 7,200,909 B2 * | 4/2007 | Peckham et al. | 29/243.54 |
| 2003/0061853 A1 | 4/2003 | Crippa | |
| 2003/0075941 A1 | 4/2003 | McIntosh et al. | |
| 2004/0261485 A1 | 12/2004 | Peruzzo et al. | |
| 2005/0138983 A1 | 6/2005 | Burger | |
| 2008/0184761 A1 | 8/2008 | Hammerer et al. | |

FOREIGN PATENT DOCUMENTS

| | | |
|---|---|---|
| DE | 31 33 205 A1 | 5/1982 |
| DE | 36 20 151 A1 | 2/1987 |
| DE | 39 22 326 C2 | 11/1990 |
| DE | 196 30 023 A1 | 1/1998 |
| DE | 601 00 147 T2 | 1/2004 |
| DE | 20 2004 011 947 U1 | 9/2004 |
| DE | 10 2004 012 297 A1 | 5/2005 |
| DE | 603 01 913 T2 | 7/2006 |
| EP | 0 021 539 A1 | 1/1981 |
| EP | 0 857 547 A1 | 8/1998 |
| EP | 1 065 015 A1 | 1/2001 |
| EP | 0 924 783 B1 | 4/2003 |
| EP | 0 934 783 B1 | 5/2006 |
| JP | 59-37083 | 2/1984 |
| JP | 2-299723 | 12/1990 |
| JP | 5-065440 | 8/1993 |
| JP | 7-232219 | 9/1995 |

* cited by examiner

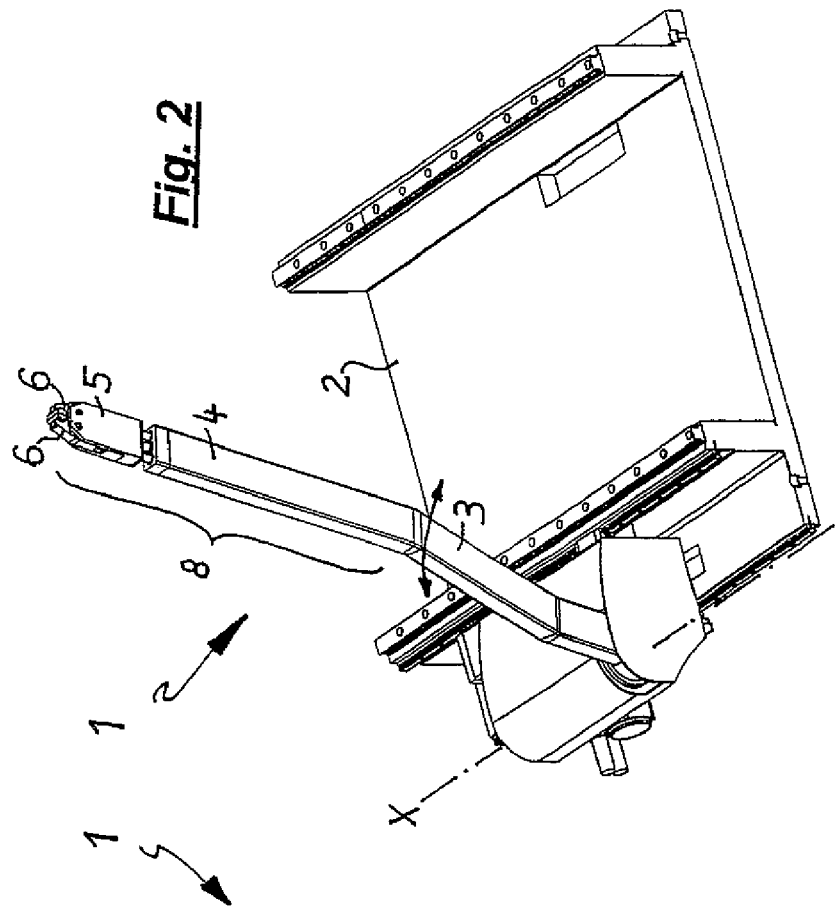
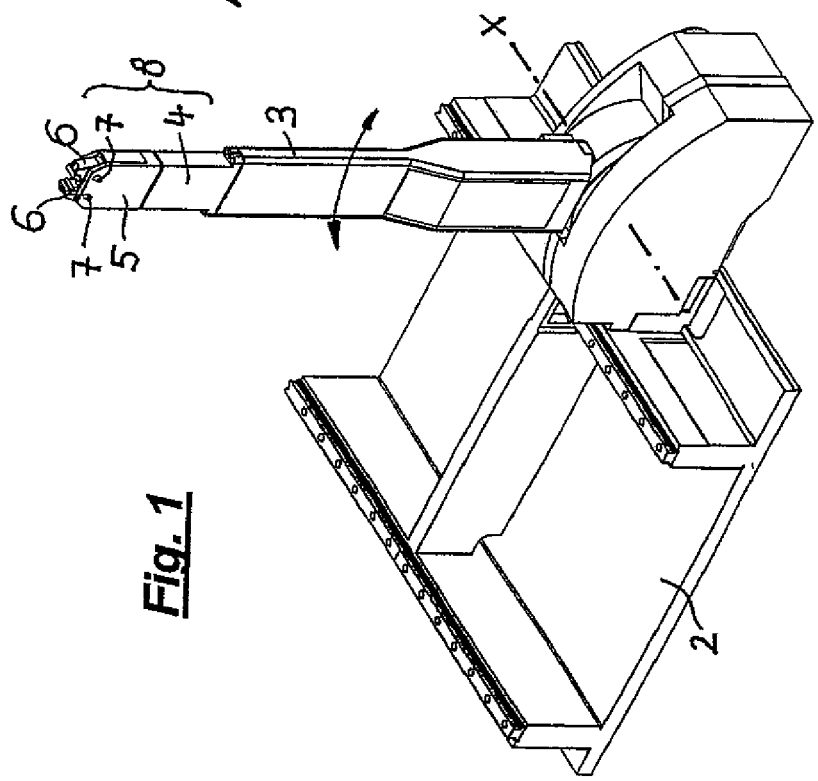

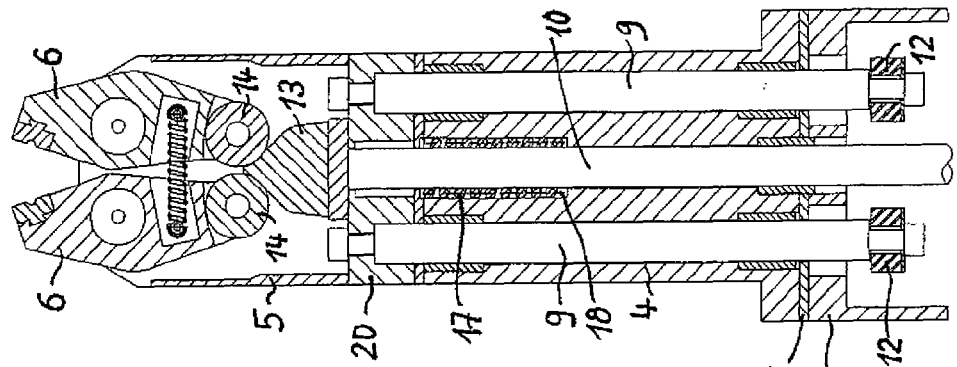
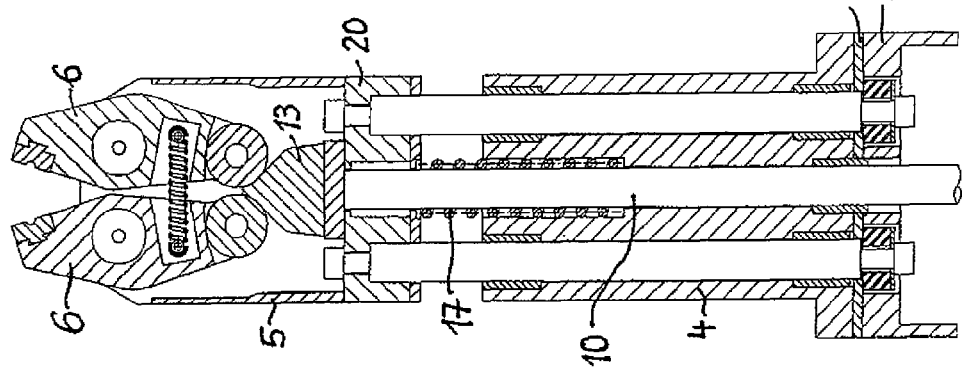
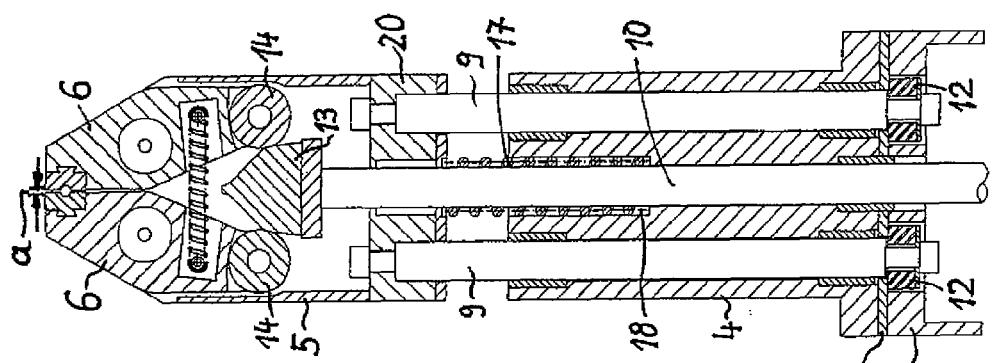
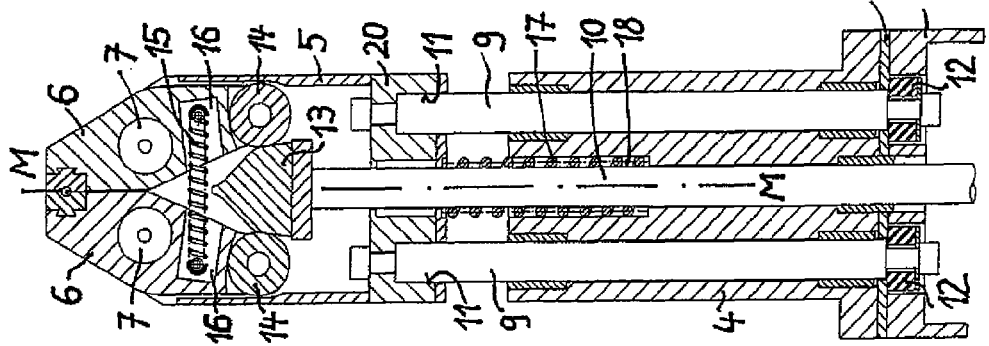

GRIPPING APPARATUS FOR GRIPPING AND HOLDING ELONGATED WORKPIECES, IN PARTICULAR FOR BENDING MACHINES

RELATED APPLICATION

The current application claims the benefit of priority to European Patent Application No. 07 005 309.5 filed on Mar. 14, 2007. Said application is incorporated by reference herein.

The invention relates to a gripping apparatus for gripping and holding elongated workpieces, in particular for bending machines, said apparatus comprising a housing which carries two gripping jaws, which are respectively movable between an opened receiving position and a closed clamping position.

BACKGROUND OF THE INVENTION

Gripping apparatuses for gripping and holding elongated workpieces, such as lines, pipes, bars, flexible lines, or the like, are used in a multiplicity of technical machines, by which they are processed in one way or another. In particular, such gripping apparatuses can be found, for example, in bending machines, such as wire-bending machines or pipe-bending machines, where they are used for both seizing a workpiece at a specific location (for example, in a magazine, at a conveyor belt or at a processing station) and then transferring it, for example, to a subsequent station (processing station or depositing belt), as well as for guiding a received workpiece to a processing position, holding it during processing and then passing it on, if necessary, to a subsequent discharge position.

In this case, a multiplicity of grippers are generally provided for inserting, depositing, transporting and fixing the workpieces in a single pipe- or wire-bending machine, one or several of these grippers serving mainly, for example, to fix the workpieces during processing and others, in the form of movable auxiliary grippers, serving to stabilize the workpiece during bending and to fetch new workpieces from the magazine. In many cases, the gripping apparatuses are located on a pivotable gripper arm, are mounted, in particular as auxiliary grippers, also such that they are movable on the base frame, and comprise a housing carrying two gripping jaws, which are movable between an opened receiving position and a closed clamping position (for receiving the workpiece).

DE 3620151 A1 discloses the use of a central holding and gripping apparatus in the form of a clamping chuck, by which the received workpiece can also be rotated about its longitudinal axis, in a machine for bending rod-shaped workpieces. If required, a second gripping apparatus may be employed, or the gripping apparatus may be attached to a robot. However, these gripping apparatuses are relatively big and bulky. The design of the clamping chuck is not explained in detail in said reference.

DE 39 22 326 C2 as well as EP 0 934 783 B1 describe gripping apparatuses which are respectively provided as simple, cylinder-operated lever mechanisms, with the respective cylinder being located directly at the gripping apparatus, so that the total mass of the latter is again relatively large.

The gripping apparatuses of DE 601 00 147 T2 are each provided with two gripping jaws executing a linear gripping movement for seizing and clamping the workpiece to be received. However, this reference does not explain the gripping movement in detail.

DE 603 01 913 T2 discloses the attachment of gripping apparatuses to a portal. In this case, the gripping apparatuses are located on gripper arms which can be pivoted about an axis that is parallel to the axis of the workpiece to be received; the gripping movement is effected via cylinders or a motor. However, there is no detailed explanation of the gripping apparatuses themselves in this reference.

DE 196 30 023 A1 describes a rotary gripping apparatus which is equipped with gripping jaws that are respectively pivotable about an axis of rotation. Said gripping jaws engage with each other via teeth and are pivoted to their respective clamping positions by two cylinders. However, this known gripping assembly has a construction which requires a considerable amount of space, and the gripping apparatus is attached to a circular ring, so that the free bending space is also limited.

Finally, a gripping apparatus of the type mentioned above is known from DE 20 2004 011 947 U1. This gripping apparatus is movable on the machine bed, but this reference does not provide any more detailed information on the specific design of the gripping apparatus itself.

SUMMARY OF THE INVENTION

In view of the above, it is an object of the invention to provide a gripping apparatus which has a comparatively simple and robust as well as space-saving construction, can assume different operative settings despite only one drive and in which the clamping force acting on the workpiece is continuously variable.

This object is achieved by a gripping apparatus of the above-mentioned type wherein, in addition to the housing, a guiding body is also provided, which supports the housing such that the housing is displaceable relative to said guiding body over a predetermined maximum travel distance between retracted and extended end positions and that the housing is displaceable with respect to guiding body, with the two gripping jaws being respectively mounted to the end region of the guiding body located in the extension direction of the housing such that they are respectively pivotable about an axis of rotation. In this case, the guiding body and the housing are still oriented along a common longitudinal axis in which a control element, which is movable relative to the housing and the gripping jaws, is also located at the end of a rod which is displaceable inside the guiding body, said control element comprising a control surface, which is located in a plane of intersection perpendicular to the axes of rotation of the gripping jaws and comprising the longitudinal axis, said control surface being symmetrical to the longitudinal axis and tapering away from the rod in the extension direction; moreover, the central axis of the control element is centrally located between both gripping jaws, and the control element is displaceable between an extended end position, in which it spreads apart the two gripping jaws' two end regions facing it, so as to assume the clamping position of the gripping jaws, and a retracted end position, in which the end regions of the gripping jaws may converge so as to assume their opened receiving position, with the housing being spring-biased away from the guiding body, the control element in its retracted end position abutting against a stop within the housing and the control element then taking the housing along in a further retraction movement of the rod into the housing, against the spring bias of the latter relative to the guiding body, until the housing contacts the guiding body.

The control element may then be provided in any suitable manner, e.g. as a toggle lever assembly between the rod end and each gripping jaw or as a sliding block guide, by which the pivoting movement of the gripping jaws is determined and controlled depending on the displacement position of the rod. However, it is quite particularly preferred for the control element to be provided as a cam body, whose cam surface forms the control surface and which, in its extended end position, is introduced between the gripping jaws' end regions facing said cam body, while said cam body spreads the gripping jaws apart, and both gripping jaws are spring-biased towards their closed end position.

Having only one axis of movement, the gripping apparatus according to the invention has a very simple design, and since it has only one drive (namely that of the rod), it can assume different working positions so as to meet the specific requirements e.g. in a pipe- or wire-bending machine. The gripping apparatus according to the invention can be mounted to a gripper arm, which is e.g. securely fitted to the frame of the bending machine, so that only the pivoting movement of the gripper arm and the longitudinal movement of the gripping apparatus along the central axis of the latter is possible, which enables both pivoting and fixing of the workpiece (for instance, during a processing operation).

However, if it is to be possible for the gripping apparatus according to the invention to be moved also along the workpiece, the gripper arm to which the gripping apparatus being mounted is likewise movably mounted to the machine frame.

A suitable form of the control element as an actuating element for the gripping jaws allows their clamping force for holding the workpiece to be continuously varied by a corresponding setting of the position of the actuating rods. The gripping apparatus according to the invention can be advantageously upgraded such that it enables a rotary movement about the longitudinal axis of the workpiece or about the longitudinal axis of the displacing rod (or about both), which then results in a particularly flexible use of a gripping apparatus equipped in this manner.

Since, when using a cam body as the control element, the gripping jaws are always spring-biased in the opening direction and are forced into their opened position for gripping a workpiece in a form- and force-fitting manner by retracting the cam body between the gripping jaws' lever ends located inside the housing, a relatively simple design of a particularly robust and highly effective control mechanism for opening and closing the gripping jaws is obtained, and the construction can be manufactured and mounted with few individual parts and with little time and effort.

Because the housing which carries the gripping jaws is mounted such that it is movable over a certain path of displacement relative to the guiding body along the longitudinal axis of the entire gripping apparatus, and because the housing is spring-biased into its extended position, a movement of the actuating rod for the two gripping jaws in the extension direction first causes displacement of the housing beyond its maximum path of displacement due to the spring bias; only thereafter, when continuing the extending movement of the actuating rod, i.e. in the fully extended position of the housing, is the closing movement of the gripping jaws caused because the control element, e.g. as a cam body, enters e.g. between the gripping jaws' two lever ends facing the control element. Until this closing movement is initiated, the two gripping jaws are in an opened condition, for example due to a bias in the opening direction, so that, when extending the housing, the gripping jaws can be moved, for example from below (or from the side), towards the workpiece to be received (a wire, for example), in the opening position, and the closing movement of the gripping jaws is not initiated by the control element in the extended condition of the housing until the workpiece has been introduced between the opened gripping jaws, which closing movement is initiated by the further continued extension movement of the housing, and finally the closed position is achieved.

If the seized workpiece is to be released again, the gripping jaws are moved to their opened end position, either in a form- or force-locking manner, by the control element during a movement of the control element in the opposite direction (retraction direction) or by a suitable spring bias. If the control element is provided as a cam body, said cam body is extended out of its position between the two gripping jaws, in which case the housing is always fully extended. In doing so, the cams—in accordance with the cross-sectional shape of the cam body—are pivoted back in the direction of their opened position under the action of the spring bias until the cam body contacts a corresponding stop in the housing. If the cam is then moved further in the closing direction, in which case the gripping jaws are fully opened, this will have the effect that, while keeping the gripping jaws in the open position, the extended housing will then be moved towards the guiding body against the spring bias between the housing and the guiding body, until the housing contacts the guiding body.

In this case, both the movement of the housing relative to the guiding body and, in the extended position of the housing, the opening and closing of the gripping jaws can be controlled simply by the motor by which the guiding rod can be driven in the directions of extension and retraction.

This also involves a relatively simple mechanical design, by which all of these different movement and/or working positions of the gripping apparatus can be controlled with ease and functional reliability.

In addition to its simple construction, the gripping apparatus according to the invention also requires very little space by comparison, and during its use even the bending space is practically not limited at all.

In the gripping apparatus according to the invention, the housing may be supported in the guiding body in any suitable way. However, particularly preferably, the housing is displaceably supported via two guiding rods in the guiding body which are located directly opposite each other with respect to the rod, each of said rods respectively being provided with a stop head, such that the latter contacts a stop face in the guiding body, when the housing has reached its maximum extension, and thus prevents any further extension movement. This displaceable positioning of the housing by two guiding rods in the guiding body also represents a simple and uncomplicated structure, which in turn considerably contributes to the simplicity of the overall construction.

As the stop head of each guiding rod, a constructional part of an elastic material, damping the impulse upon contact is preferably used, which again preferably may be a plastic pin in each case.

In a further preferred embodiment of the gripping apparatus according to the invention, the spring bias between the housing and the guiding body is built up by means of a coil spring, which is arranged around the actuating rod for the control element and whose end regions are each located in a corresponding recess in the guiding body or in the housing, respectively, said coil spring being pressure biased in each position of the housing relative to the guiding body. Again, this design also provides a very simple, reliably mechanically acting build up of the desired spring bias between the housing and the guiding body, which also always ensures reliably functioning with respect to the relative movement it causes between the housing and the guiding body.

Each of the two gripping jaws is preferably provided as a two-arm lever, such that their axis of rotation is located in a central region of each gripping jaw, so that in each gripping jaw a respective lever arm extending outwardly over the housing serves to receive the workpiece to be processed, while on the other side of the axis of rotation, i.e. at the other lever arm's other end region, located completely inside the housing, engagement with the control element can be effected to close the gripping jaws. In this case, the gripping jaws' ends located inside the housing are preferably provided with rotatably supported rollers, which the control element engages when retracting between the gripping jaws and which are supported on the control surface of the control element.

The drive of the rod moving the control element can be provided in any suitable manner. However, particularly preferably, the rod is actuated via a corresponding pneumatic cylinder by which the movement of the rod in its two opposite directions of movement can be provided in a simple and space-saving manner.

In the gripping apparatus according to the invention, the two gripping jaws are preferably biased towards their opened receiving position by a tension spring; preferably again, this tension spring has each of its end regions extending respectively into a corresponding receiving opening of the assigned gripping jaw and its end fixed to the gripping jaw therein.

DESCRIPTION OF THE FIGURES

The invention will be explained in more detail below, principally by way of example and with reference to the drawing, wherein:

FIG. 1 shows a perspective view of a gripper comprising a gripping apparatus according to the invention, said gripper being mounted to the machine frame such that it is not displaceable relative to said machine frame;

FIG. 2 shows a perspective view of a gripper comprising a different embodiment of a gripping apparatus according to the invention, said gripper being mounted to a machine frame such that the gripper is displaceable in the longitudinal direction of said machine frame;

FIGS. 4, 5, 6 and 7 show longitudinal sections of an assembly according to FIG. 3, in like sectional positions, but with four respectively different extension positions of the rod comprising the control element in the form of a cam body.

FIGS. 1 and 2 show two different embodiments of grippers, each comprising a gripping apparatus and being generally referred to by the reference symbol 1.

DETAILED DESCRIPTION OF PREFERRED EMBODIMENTS

Figure 3:
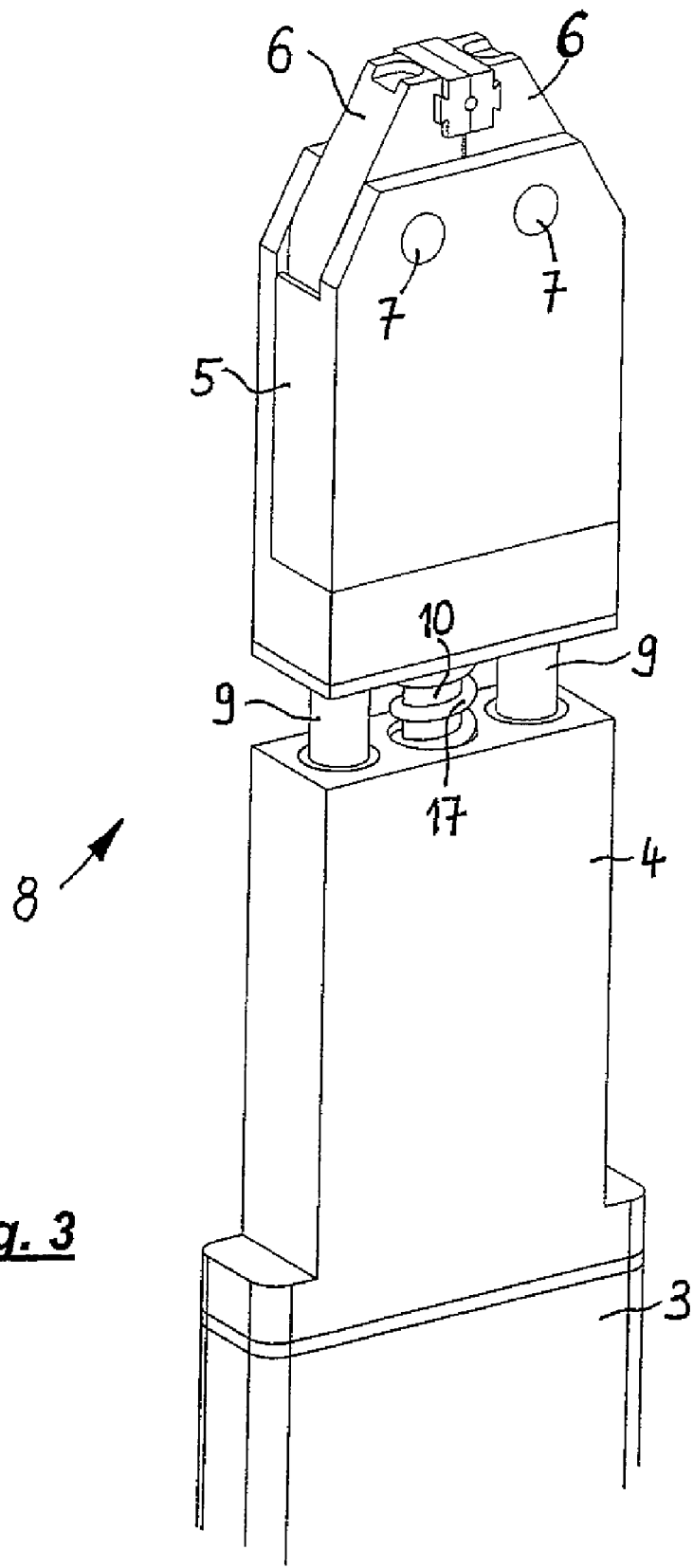
FIG. 3 shows an enlarged perspective partial view of a gripping apparatus according to the invention with the housing extended.

FIG. 1 shows a perspective view of a gripper 1, which is used as a discharge gripper or as holding pliers, is centrally mounted to a base frame of a wire-bending machine and mainly serves to fix the received workpieces during processing.

In contrast thereto, FIG. 2 shows, again in perspective view, a gripper 1 serving as an auxiliary gripper and being mounted to the base frame 2 of a bending machine, but also being movable relative to said frame. Such movable auxiliary grippers stabilize the workpieces during bending and fetch new workpieces from the magazine or a conveyor belt.

Each of the two grippers 1 comprises a gripper arm 3, which is pivotable about a pivoting axis X and has a respective gripping apparatus 8 mounted thereon.

At its freely protruding end, the gripper arm 3 carries a guiding body 4 adjoined by a housing 5 which is supported within the guiding body 4 so as to be displaceable and moveable relative to said guiding body. The assembly consisting of the guiding body 4 and of the housing 5 (including their built-in elements) constitutes the actual gripping apparatus 8.

On the housing 5, there are provided, respectively articulated in a pivotable manner via an axis of rotation 7, two gripping jaws 6 which protrude from said housing and can be pivoted with respect to each other, namely between open and closed states.

Whereas the representation of FIG. 1 shows a position in which the housing 5 contacts the guiding body 4, i.e. is in its retracted position in which the gripping jaws 6 are opened, the representation according to FIG. 2 shows the housing 5 in its position extended out of the guiding body 4, in which position the two gripping jaws 6 assume their closed clamping position.

As FIGS. 1 and 2 further show, the guiding body 4 is securely mounted to the respective gripper arm 3 by suitable fasteners (preferably screws, for example) not shown in detail.

FIG. 3 shows a clearly enlarged perspective view of a gripper 1, which corresponds to the embodiment of FIG. 1; however, the constructive design fully applies also to a different embodiment, such as that which is shown in FIG. 1.

However, unlike shown in FIG. 1, FIG. 3 shows the housing 5, which carries the clamping jaws 6, in the end position in which the housing 5 is extended away from the guiding body 4.

FIG. 4 shows (in a non-enlarged representation) a central longitudinal section through the assembly of FIG. 3.

The gripping apparatus 8 is mounted, as shown in FIGS. 1 and 2, to the protruding end of the gripper arm 3 of an auxiliary gripper, of holding pliers or of a discharge gripper by suitable fasteners, which were already mentioned above and are not shown in detail in the figures.

The guiding body 4 is fitted directly onto the gripper arm 3, and two guiding rods 9 are supported in the guiding body 4, as is apparent from FIG. 3 and in particular FIG. 4, so that they are displaceable in a direction which is parallel to the central longitudinal axis M of the gripper arm 3 and of the guiding body 4.

Further, a rod 10, which is also displaceable in the direction of the central longitudinal axis M, is supported in the guiding body 4, such that the central longitudinal axis of this rod 10 coincides with the central longitudinal axis M of the gripping apparatus 8.

The guiding rods 9 are respectively introduced, at their upper ends facing the housing 5, into corresponding receiving recesses 11 of the housing 5, were they are connected to the bottom region 20 of the housing 5 in a suitable manner, which connection is illustrated only very schematically in FIGS. 3 to 7.

Mounted to the lower ends of the guiding rod 9 are resiliently flexible plastic pins or plastic rings 12, respectively, which have an external diameter that is greater than the through hole provided for each guiding rod 9 in the guiding body 4, so that, when moving the housing 5 in a direction away from the guiding body 4, the plastic pins 12, upon reaching the maximum desired extension position (cf. FIGS. 3 and 4), respectively abut against the end surface of the guiding body 4 facing them or against an intermediate plate 19 covering said surface, respectively, which thus forms a stop for the plastic pins 12 and terminates the extension movement of the guiding rod 9.

The actuating rod 10 passes through the guiding body 4 and enters the interior space of the gripper arm 3 behind said guiding body 4, where the actuating rod 10 can be moved by a pneumatic cylinder in the direction of the central axis M in one place (not shown in the Figures).

To the upper end of the rod 10, there is mounted a control element in the form of a cam body 13, whose cam contour (control surface) has a cross section, as shown in FIGS. 4 to 7, whose width is symmetrical to the central axis M and continuously decreases in the direction of said central axis M, with the specific cam shape being selected such that a desired course of the opening and closing movement of the gripping jaws 6 is achieved during their rotation about the axes of rotation 7 at a predetermined amount of the retracting movement of the cam body 13 between rollers 14 which are attached to the lower end region of each of the gripping jaws 6.

The respective axis of rotation 7 of a gripping jaw 6 is located in a central region of the latter between its two ends, with the respective lever arm being suitably selected according to the desired clumping forces and the forces of pressure of the cam body 13.

As FIGS. 4 to 7 further show, the gripping jaws 6 have attached to them, between their rotary axes 7 and the rollers 14, a biasing tension spring 15, which extends into a special recess 16 of a gripping jaw 6 with both of its end regions and is mounted to said gripping jaw 6 there by its end.

The spring 15 is biased in the tension direction such that a tension bias is exerted upon the gripping jaws 6 at all times and in any position of the two gripping jaws 6, i.e. also in their fully opened position (cf. FIG. 7). In this manner, there is always a spring bias acting on the gripping jaws 6 towards their opened position (cf. FIGS. 6 and 7).

A compression spring 17 is also provided between the guiding body 4 and the housing 5, said compression spring 17 extending around the rod 10 in the central region of the gripping apparatus 8 and always building up a pressure bias in a direction towards the extended position of the housing 5 in any position of the two parts 4 and 5 relative to each other. This compression spring 17 is supported at its upper end on the lower surface of the housing 5, whereas its other axial side extends into an annular receiving space 18, which is provided in the central region of the guiding part 4, around the rod 10, as shown in FIGS. 4 to 7. The axial length of the annular receiving space 18 is dimensioned such that, in the state of the housing 5 in which it is fully extended as far as the guiding body 4, the compression spring 17 is seated entirely inside the annular receiving space 18, as shown in FIG. 7.

The bias of the compression spring 17 is selected such that the latter exerts a bias in the extension direction even in the extended condition of the housing 5 as shown in FIGS. 3 and 4.

Detailed reference will now be made to the different working positions of the gripping apparatus 8 shown in FIGS. 4 to 7:

FIG. 4 shows the closed position of the gripping jaws 6, between which a workpiece (not shown) is securely fixed.

The rod 10 is fully extended and, thus, the cam body 13 is retracted between the rollers 14, while pushing them outwardly.

The housing 5 is urged into its extended position by the compression spring 17, in which extended position the guiding rod 9 with its plastic pins 12 is in contact with the lower surface of an intermediate plate 19 arranged between the gripper arm 3 and the guiding part 4 as a stop.

FIG. 5 shows a position in which the housing 5 is still fully extended, while the rod 10 comprising the cam body 13 has been retracted somewhat, to such an extent that the two gripping jaws 6 are no longer in their fully closed position, which is still present in FIG. 6, but now open a very small gap a, which is smaller, however, than the diameter of the workpiece (e.g. a wire) received between the gripping jaws 6. In this position, the gripping jaws 6, and, thus, the gripping apparatus 8 can be moved along the received workpiece in the longitudinal direction of the latter, or the workpiece can be displaced in the gripping apparatus 8, relative to the latter. However, it is then not possible to remove the workpiece from the gripping apparatus 8.

FIG. 6 shows an opened position of the gripping apparatus 8. In this case, the rod 10 has been lowered so far that the lower surface of the cam body 13 contacts the top surface of the bottom 20 of the housing 5, in which position the gripping jaws 6 are fully opened. The workpiece can now be taken out upwardly from the gripping apparatus 8, in which case pivoting of the gripping apparatus 8 about the pivoting axis X is not possible without first removing the workpiece.

Finally, FIG. 7 shows the fully lowered and opened position of the gripping apparatus 8. The rod 10 is fully lowered and, in doing so, has pulled the housing 5 downwards against the action of the compression spring 19 also to such an extent that the housing 5 is in contact with the upper surface of the guiding body 4.

In doing so, the guiding rods 9 have also been lowered and the resilient parts 12 (plastic pins) are now no longer supported on the intermediate plate 19 at the lower surface of the guiding body 4, as shown in FIG. 7.

Thus, the workpiece can be taken out of the gripping apparatus 8 without any vertical movement, i.e. the gripping apparatus can pivot away without colliding with the workpiece.

The invention claimed is:

1. A gripping apparatus for gripping and holding elongated workpieces, in particular for bending machines, said apparatus comprising:

a guiding body and an axially consecutive housing located on a common longitudinal axis, the housing, carrying two gripping jaws, each of said gripping jaws being pivotable about an axis of rotation and movable between an opened receiving position and a closed clamping position, the guiding body having an axial end surface facing the housing and guidingly supports the housing such that the housing is displaceable with respect to the guiding body axially in an extension direction over a predetermined maximum travel distance from a retracted initial position, in which the housing is in only axial contact with said axial end surface of the guiding body, to an end position, in which the housing is the predetermined maximum travel distance axially away from said axial end surface of the guiding body, wherein the gripping jaws are mounted to an end region of the housing opposite from the guiding body, the gripping apparatus further comprising a control element attached to an end of a rod, the control element movable relative to the housing and to the gripping jaws, the rod is movable within the guiding body, said control element comprising a control surface, which is located in a plane of intersection perpendicular to the axes of rotation of the gripping jaws and comprising the longitudinal axis, said control surface being symmetrical to the longitudinal axis and tapering away from the rod in the extension direction, with the central axis of the control element being centrally located between both gripping jaws, and the control element being displaceable between an extended end position, in which it spreads apart the two gripping jaws' end regions facing it, so as to assume the clamping position of the gripping jaws, and a retracted end position, in which the end regions of the gripping jaws converge so as to assume their opened receiving position, and the control element, in its retracted end position, abutting against a stop in the housing, wherein the housing being constantly spring-biased in a direction away from said axial end surface of the guiding body towards the extended end position of the housing by a compression spring provided between the guiding body and the housing, and the control element, having reached its retracted end position upon being retracted, takes the housing along in a further retraction movement, against the spring bias of the latter relative to the guiding body until the housing contacts the guiding body.

2. The gripping apparatus as claimed in claim 1, wherein the housing is supported by two guiding rods so as to be displaceable with respect to the guiding body, said guiding rods being located directly opposite each other relative to the rod and parallel to the latter, each guiding rod being provided with a stop head which, when the housing has achieved its maximum extension, contacts a stop surface of the guiding body.

3. The gripping apparatus as claimed in claim 2, wherein the stop head of each guiding rod is provided as an elastic part.

4. The gripping apparatus as claimed in claim 3, wherein each elastic part is a plastic pin.

5. The gripping apparatus as claimed in claim 1, wherein the spring bias between the housing and the guiding body is effected by the coil spring which is arranged around the rod and whose end regions are each fitted in a corresponding recess in the guiding body or in the housing, respectively, and which is compressed in any position of the housing.

6. The gripping apparatus as claimed in claim 2, wherein the spring bias between the housing and the guiding body is effected by the coil spring which is arranged around the rod and whose end regions are each fitted in a corresponding recess in the guiding body or in the housing, respectively, and which is pressure-biased in any position of the housing.

7. The gripping apparatus as claimed in claim 1, wherein both gripping jaws are supported on the guiding surface of the control element by rollers which are rotatably supported at the end regions of the gripping jaws.

8. The gripping apparatus as claimed in claim 2, wherein both gripping jaws are supported on the guiding surface of the control element by rollers which are rotatably supported at the end regions of the gripping jaws.

9. The gripping apparatus as claimed in claim 5, wherein both gripping jaws are supported on the guiding surface of the control element by rollers which are rotatably supported at the end regions of the gripping jaws.

10. The gripping apparatus as claimed in claim 1, wherein the two gripping jaws are biased towards their opened receiving position by a tension spring.

11. The gripping apparatus as claimed in claim 2, wherein the two gripping jaws are biased towards their opened receiving position by a tension spring.

12. The gripping apparatus as claimed in claim 5, wherein the two gripping jaws are biased towards their opened receiving position by a tension spring.

13. The gripping apparatus as claimed in claim 7, wherein the two gripping jaws are biased towards their opened receiving position by a tension spring.

14. The gripping apparatus as claimed in claim 10, wherein the tension spring has each of its end regions extending into a receiving opening of the assigned gripping jaw and has its end fixed to the gripping jaw there.

15. A gripping apparatus for gripping and holding workpieces, the gripping apparatus having a longitudinal axis, said apparatus comprising:

a guiding body;

a housing;

a pair of parallel guiding rods and a control rod extending from the guiding body, the control rod positioned intermediate and parallel to the guiding rods, the control rod and guiding rods extending parallel to the longitudinal axis between the housing and guiding body;

the housing having a pair of gripping jaws each pivotally with respect to the housing and each having a gripping end, the pair of gripping jaws further having a pair of rollers respectively mounted on an end opposite the gripping end of each gripping jaw, the housing longitudinally movable from a position proximal to the guiding body to a position further away from, axially displaced from, and separated from the guiding body, the housing guided by the guiding rods, the housing movable by way of the axial control rod, a tapered and symmetrical control element positioned in the housing and attached to the control rod, the control element insertable and withdrawable with respect to the pair of rollers of the pair of gripping jaws by way of axial movement of the control rod, whereby when the control element is inserted, the rollers are moved in a separation direction and the gripping jaws are closed, may be closed and opened by longitudinal movement of the control rod.

16. The gripping apparatus of claim 15 wherein a spring biases the housing to the position displaced and separated from the guiding body.

17. The gripping apparatus of claim 15, wherein the control rod and the guiding rods are all slidably movable within the guiding body.

18. The gripping apparatus of claim 15, wherein the pair of rollers on the pair of gripping jaws are urged together by a spring which also urges the gripping jaw to the opened position.

19. A gripping apparatus for gripping and holding workpieces, the gripping apparatus having a longitudinal axis, said apparatus comprising:

a guiding body;

a housing;

a pair of parallel guiding rods and a control rod extending from the guiding body, the control rod positioned intermediate and parallel to the guiding rods, the control rod and guiding rods extending parallel to the longitudinal axis between the housing and guiding body;

the housing having a pair of gripping jaws each pivotally with respect to the housing, the housing longitudinally movable between a position proximal to the guiding body to a position separated from the guiding body, the housing fixed to the guiding rods and the guiding rods slidable engaged with the guiding body, the housing movable between the position proximal to the guiding body to the position separated from the guiding body by way of the axial control rod;

a tapered and symmetrical control element positioned in the housing and attached to the control rod, the control element insertable and withdrawable with respect to the pair of gripping jaws, whereby the gripping jaws may be closed and opened by longitudinal movement of the control rod; and a spring postioned to bias the housing to the position separated from the guiding body.

* * * * *